US008908028B2

(12) United States Patent
Metzler et al.

(10) Patent No.: US 8,908,028 B2
(45) Date of Patent: Dec. 9, 2014

(54) CALIBRATION METHOD FOR A MEASURING SYSTEM (75) Inventors: Bernhard Metzler, Dornbirn (AT); Bernd Walser, Heerbrugg (CH); Beat Aebischer, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 557 days.

(21) Appl. No.: 13/321,157

(22) PCT Filed: Jun. 24, 2010

(86) PCT No.: PCT/EP2010/059032
§ 371 (c)(1),
(2), (4) Date: Nov. 17, 2011

(87) PCT Pub. No.: WO2011/000781
PCT Pub. Date: Jan. 6, 2011

(65) Prior Publication Data
US 2012/0098958 A1    Apr. 26, 2012

(30) Foreign Application Priority Data
Jun. 30, 2009    (EP) .................................... 09164232

(51) Int. Cl.
*G06K 9/00*    (2006.01)
*B25J 9/16*    (2006.01)
(52) U.S. Cl.
CPC ..... *B25J 9/1697* (2013.01); *G05B 2219/37008* (2013.01); *G05B 2219/37009* (2013.01); *G05B 2219/37015* (2013.01); *G05B 2219/37017* (2013.01); *G05B 2219/37567* (2013.01)
USPC ........................................... 348/95; 348/135

(58) Field of Classification Search
USPC .................................................... 348/95, 135
See application file for complete search history.

(56) References Cited

U.S. PATENT DOCUMENTS

| 5,168,453 | A | 12/1992 | Nomaru et al. | |
| 2005/0201610 | A1* | 9/2005 | Hertzman et al. | 382/151 |
| 2007/0294695 | A1 | 12/2007 | Jensen et al. | |
| 2009/0055024 | A1 | 2/2009 | Kay | |
| 2012/0072021 | A1 | 3/2012 | Walser et al. | |

FOREIGN PATENT DOCUMENTS

| EP | 0766156 A | 4/1997 |
| EP | 1345099 A | 9/2003 |
| EP | 2075096 A | 7/2009 |

(Continued)

OTHER PUBLICATIONS

Ishida H., et al, "Two arc welding robots coordinated with 3-D vision sensor", Industrial Electronics, Control and Instrumentation, 1994. IECON '94., 20th International Conference on Bologna, Italy 5-9 S'EFT. 1994, New York, NY, USA,IEEE, vol. 2, Sep. 5, 1994, pp. 830-834, XP010137569, ISBN: 978-0-7803-1328-6.

*Primary Examiner* — Sath V Perungavoor
*Assistant Examiner* — Jeffery Williams
(74) *Attorney, Agent, or Firm* — Maschoff Brennan (57) ABSTRACT According to the invention, the calibration measuring cycle is divided into several, particularly a plurality of partial cycles, with which one or more of the calibration measurements are associated. While maintaining the cycle, the partial cycles are now carried out in one of the positioning pauses such that the calibration measuring cycle is distributed over several, in particular a plurality of, positioning pauses and is integrated into the flow of the industrial process without interfering with the same.

19 Claims, 6 Drawing Sheets (56) References Cited

FOREIGN PATENT DOCUMENTS

| EP | 2 255 930 A1 | 12/2010 |
| WO | 2006/099951 A1 | 9/2006 |
| WO | 2007/004983 A | 1/2007 |
| WO | 2009/029127 A | 3/2009 |

* cited by examiner

CALIBRATION METHOD FOR A MEASURING SYSTEM

FIELD OF THE INVENTION

The invention relates to a calibration method for a measuring system, a computer program product for carrying out the calibration and to a measuring system for determining a positioning of an object that is to be positioned in a defined fashion within the scope of an industrial process.

BACKGROUND

Methods and systems for very precisely positioning at least one object into a defined final position in space by means of an industrial robot and a measuring system are used, in particular, in production and assembly processes along automated assembly lines, for example in the automotive industry. Here an object, for example a sheet body part or any other body part, should, by means of an industrial robot, be brought, very precisely, into a specific position and alignment in space in order to carry out a work step.

The prior art has disclosed handling systems, more particularly industrial robots, e.g. articulated robots, for defined positioning of an object into a predetermined position and alignment in space, which object is gripped by means of a gripper device. Here, the industrial robots can have internal measuring systems that can capture the position of the limbs of the handling system and hence provide information in respect of the position and alignment of the gripper device in space.

Hence it is possible to move the gripper device, including the gripped object, into a specific predefined position by means of an appropriate input for the robot control. Hence, the gripped object is positioned in space by prescribing a position of the gripper device. However, it is the two following problems in particular that arise from this.

Firstly, the internal measuring system of conventional industrial robots designed for holding heavy objects is not precise enough for allowing the gripper device to assume a position in space that is that precise as required for some assembly methods. Although the drives of industrial robots are sufficiently precise, their measuring systems are not. The kinematic chain multiplies the measuring errors of the individual measuring members. This results from both the measurement inaccuracies of the individual measuring members, more particularly the angle measurers of an articulated robot, and the unavoidable elasticity of the robot members.

Secondly, the position of the gripper device, and hence the position thereof in space, does not necessarily provide the position of the object in space because the object can usually only be gripped within a gripping tolerance. This gripping tolerance is often far greater than the required positioning accuracy. Hence the gripping error, i.e. the relative position of the object with respect to the gripper device, must likewise be taken into account. To this end, use is made of separate measuring systems, more particularly contactless optical measuring systems, which are no longer part of the robot. Only these measuring systems allow the object to be positioned at a specific position in space with the required accuracy.

Such contactless measuring systems, which can be used for positioning an object very precisely into a final position in space within the scope of an industrial process, are for example described in the two European patent applications numbered 07124101.2 and 09161295.2, as outlined below.

The method described in the European patent application numbered 07124101.2 is carried out by means of an industrial robot, a first optical recording apparatus and at least a second optical recording apparatus. The first industrial robot can be moved into predetermined positions. It is calibrated internally, as well as calibrated in the three-dimensional coordinate system of the space and related to the latter. The first optical recording apparatus, which is calibrated in a three-dimensional coordinate system of the space and positioned at a known first position with a known alignment, comprises an optically calibrated first camera for recording an image within a specific first field of view; a first drive unit for aligning the first camera, which brings about a change in the first field of view; and a first angle measuring unit, calibrated in the coordinate system of the space, for very precisely capturing the angular alignment of the first camera such that the first field of view can be determined in the coordinate system of the space. The at least one second optical recording apparatus, which is calibrated in the three-dimensional coordinate system of the space and positioned at a known second position with a known alignment, comprises an optically calibrated second camera for recording an image within a specific second field of view; a second drive unit for aligning the second camera, which brings about a change in the second field of view; and a second angle measuring unit, calibrated in the coordinate system of the space, for very precisely capturing the angular alignment, of the second camera such that the second field of view can be determined in the coordinate system of the space. The at least two positions, i.e. the position of the first and the second recording apparatus, are spaced apart such that three-dimensional image recording of the at least one object by means of the at least two recording apparatuses is made possible as a result of at least partly overlapping fields of view.

The method comprises the following steps:

A first object, having known first features that can be captured by optical means, is gripped and held within a gripping tolerance by the first industrial robot.

Such a first compensating variable, which corrects the gripping tolerance, is determined for the first industrial, robot such that the first object can be moved in compensated fashion in the coordinate system of the space by prescribing a position of the first industrial robot. The first compensating variable is determined by the following steps: respectively using the drive units for aligning the at least two cameras, with at least partly overlapping fields of view of the cameras, with respect to at least some of the first features of the first object, which is held in a first compensating position of the first industrial robot; recording first image recordings by means of the two cameras; determining the position of the first object in the first compensating position of the first industrial robot in the coordinate system of the space by using the positions of the recording apparatuses, the angular alignments of the cameras that were captured by the angle measuring units, the first image recordings and knowledge in respect of the first features on the first object; and determining the first compensating variable by using the first compensating position of the first industrial robot and at least the determined position of the first object in the first compensating position of the first industrial robot.

By means of the following repeating steps, the first object is moved very precisely into a first final position until the first final, position is reached within a predetermined tolerance:

Recording further first image recordings using the cameras; determining the current position of the first object in the coordinate system of the space using the positions of the recording apparatuses, the angular alignments of the cameras captured by the angle measuring units, the additional first image recordings and knowledge in respect of the first features on the first object; calculating the difference in position between the current position of the first object and the first final position; calculating a new intended position of the first industrial robot taking into account the first compensating variable from the current position of the first industrial robot and a variable linked to the difference in position; and moving the first industrial robot into the new intended position.

Moreover, the European patent application numbered 07124101.2 describes the same system for very precisely positioning at least one object into a final position in space comprising an industrial robot, a first optical recording apparatus, a second optical recording apparatus and a control unit. Here, the control unit is used to control the recording apparatuses and the industrial robot such that these accordingly carry out the method described above.

This described method and corresponding system is particularly distinguished by flexibility, precision and fast process speed.

The European patent application numbered 09161295.2—in parallel to the method and system from the European patent application numbered 07124101.2—also describes such a method and system for very precisely positioning at least one object into a final position in space, wherein, however, 3D image recording apparatuses are utilized as recording apparatuses.

Here, she prior art has disclosed different 3D image recording apparatuses. By way of example, there are 3D image recording apparatuses that are substantially composed of two or three cameras, wherein she cameras are housed, fixedly coupled to one another, in a common housing with a distance between them—i.e. with a stereo basis—for recording a scene from respectively different perspectives, with however said perspectives being fixed relative to one another. Since the recorded area section does not necessarily have characteristic image features that make electronic processing of the images possible, markings may be applied to the area section. These markings can be generated by means of a structured beam of light, more particularly a laser beam, projected onto the area section by the 3D image recording unit, which for example projects an optical grid or an optical marking cross. Such 3D image recording units usually also contain an image processing apparatus, which derives a three-dimensional image from the plurality of images from different perspectives, which images were recorded substantially simultaneously.

By way of example, such 3D image recording units include the image recording systems made by "CogniTens", which are marketed under the names of "Optigo" and "OptiCell" and contain three cameras arranged in an equilateral triangle, and also the system "Advent" from "ActiCM", which has two high-resolution CCD cameras arranged next to one another and a projector for projecting structured light onto the section to be recorded.

The coordinates of recorded image elements to be measured are usually determined by means of referenced markings within the image, with these markings forming the basis for the actual 3D coordinate measurement. Herein, the image coordinate system, which relates to the recorded three-dimensional image and hence is related to the 3D image recording unit, is transformed into the object coordinate system, within which the object should be measured and which for example is based on the CAD model of the object. The transformation is undertaken on the basis of recorded reference markings, the positions of which are known in the object coordinate system. The 3D image recording units known from the prior art herein achieve accuracies of less than 0.5 millimeters.

Furthermore, 3D scanning systems are known, more particularly in the form of 3D scanners with electro-optical distance measurement; these carry out depth scanning within an area region and generate a point cloud. Here, a distinction should be made between serial systems, in which a point-like measurement beam scans an area point-by-point; parallel systems, in which a line-like measurement beam scans an area line-by-line; and fully parallel systems, which simultaneously scan a multiplicity of points within an area region and hence carry out a depth recording of the area region. In general, what is common to all these systems is that the depth scanning is carried out by means of at least one distance measurement beam that is directed at the area and/or moved over the area.

Moreover, there are RIM cameras, also referred to as RIMs or range imaging systems, which can be used to record an image of an object while at the same time capturing depth information for each pixel or a group of pixels. Hence it is possible to use a single device for capturing a three-dimensional image, in which depth information, i.e. distance information from the camera, is assigned to each pixel or to a multiplicity of pixel groups.

WO 2007/004983 A1 (Pettersson) has disclosed a method for welding together workpieces, more particularly pressed sheet parts or composite sheets. The workpieces to be joined together are held by industrial robots and are positioned relative to one another by the latter for being joined together by welding. During the production of the welding joint, the workpieces are held in the respective positions by the industrial robots such that the relative position of the parts with respect to one another is maintained. By way of example, a welding robot undertakes the welding. A measuring system measures the positions of the workpieces in order to enable the workpieces to be positioned before the welding procedure. In particular, there is continuous measuring during the welding procedure. The described method affords the possibility of dispensing with the otherwise conventional workpiece-specific molds and workpiece receptacles, which are laborious to produce, and into which the workpieces have to be fixed prior to the welding. The industrial robots can be used universally for differently shaped and embodied workpieces because the process of capturing the position of the workpieces by means of the measuring system allows identification and monitoring of the workpieces, and also precise relative positioning of the parts with respect to one another. Hence a single system can be used for different workpieces. Thus, exchanging workpiece receptacles is dispensed with. According to the disclosure, the described method is particularly suitable for welding sheet parts, particularly in the automotive industry. In general, a laser triangulation method, in which previously defined points on the workpiece are measured, is mentioned as a possible measuring system. By way of example, reflectors are to this end applied to the workpiece. According to the description, the position of each reflector can be established by means of a light source and a two-dimensional detector, and so the position and alignment of the workpiece can be captured by using three such points.

What is common to these systems and methods is that the positions of a plurality of labeled points on the object can be established by means of a contactless, photogrammetric coordinate measurement with the aid of image processing systems.

In order to calibrate such a measuring system, with the aid of which an object can be positioned very precisely into an intended position within the scope of an industrial process, it is known to carry out in advance a multiplicity of calibration measurements using a predetermined and routine calibration measurement cycle. Here, the calibration measurement cycle is designed such that it has at least a certain number and variety of calibration measurements. Using the calibration measurement data—captured when the calibration measurements are carried out—it is now possible to determine calibration parameters that at least relate to position and orientation of the recording apparatus of the measuring system in a defined coordinate system, and in particular also relate to internal calibration parameters of individual components of the measuring system such as camera constant, main point, camera distortion, calibration parameters of the angle measuring unit, etc.

In particular, the calibration measurement cycle can have such a number and variety of calibration measurements that the calibration parameters are overdetermined by the calibration measurement data captured in the process. Then, the calibration parameters can be established by e.g. fitting, more particularly according to the least squares method.

By way of example, it is possible as calibration measurements to capture respective images—in different alignments—using the first camera and the respective angular alignments using the angle measuring unit. Moreover, it is possible to determine image coordinates of one or more defined target markers in the captured images using electronic image processing wherein, in particular, the positions of the target markers arranged in space in a defined fashion and/or the distances between the target markers in the coordinate system of the space are known very precisely.

That is to say the calibration measurements in a calibration measurement cycle are for example respectively carried out under variation, in particular a predefined variation, of the angular alignment of the camera or cameras and/or under variation of the positions of the target markers in the coordinate system of the space, with the positions of the target markers and/or a shift of the target markers between the calibration measurements in the coordinate system of the space respectively being known or codetermined. From the overview provided by carrying out such a preprogrammed procedure of a calibration measurement cycle with a multiplicity of calibration measurement data captured during different calibration measurements, it is possible subsequently to establish the current external and internal calibration parameters of the measuring system.

Unstable surroundings result in time-dependent external influences on the measuring system (such as drifts from changes in temperature, vibrations and/or deformations). This may require repeated calibration—particularly of the external orientation parameters of ail recording apparatuses of the measuring system.

There should be complete recalibration of the measuring system, e.g. approximately twice daily, under the usual conditions in order respectively to obtain sufficiently fitted calibration parameters in respect of the current surroundings and external influences. Since—in the case of carrying out a known recalibration measurement cycle according to the prior art—each of these recalibrations requires e.g. approximately 30 minutes or more, this could lead to breaks in production that are a multiple of the production cycle times. In conventional industrial/production processes (e.g. in the automotive industry), usual production cycle times last between approximately 30 and 120 seconds depending on the complexity of the production step/processing process (welding, adhesive bonding, folding, transporting, monitoring, etc.) or of the parts to be processed (doors, body, roof, bonnet, etc.).

This results in the conflicting goals of, firstly, providing a measuring system that was respectively calibrated as recently as possible and hence allows high precision and of, secondly, disturbing/delaying the production advance of the industrial/production process, for which the measuring system is used, as little as possible or, in a best case scenario, not disturbing/delaying it at all. These conflicting goals have until now not been resolved satisfactorily in the prior art.

Moreover, even such "time-based samples" of a recalibration, carried out approximately twice daily, would not permit direct immediate intervention in (correction of) positioning measurements that take place for very precisely positioning the object within the scope of the industrial process.

SUMMARY

Thus, an object of the invention is to provide an improved calibration method for a measuring system that is designed to determine a positioning of an object that is to be positioned in a defined fashion within the scope of an industrial process. In particular, it should be possible to resolve the aforementioned conflicting goals in this case in an improved fashion such that the calibration data of the measuring system can be adapted to the external conditions in a sufficiently timely fashion but the industrial/production process is nevertheless less (more particularly not at all) disturbed and/or delayed by the calibration measurements required therefor.

This object is achieved by implementing the characterizing features of the independent claims. Features that alternatively or advantageously develop the invention can be gathered from the dependent patent claims.

The invention relates to a calibration method for a measuring system, which is designed to determine a positioning of an object (e.g. one or more parts that are to be processed within the scope of the process or a tool that is used within the scope of the process) that is to be positioned in a defined fashion into a predetermined final position in space within the scope of an industrial process. Here, the measuring system is more particularly designed to establish the positions of a plurality of labeled/marked points on the object by means of contactless photogrammetric coordinate measurements with the aid of image processing systems. As a person skilled in the art already knows, the measuring system may for this purpose comprise at least a first recording apparatus with a first camera for capturing a first image within a first field of view and with a first angle measuring unit for very precisely determining a first angular alignment of the first camera. More particularly, it is also possible for at least two such recording apparatuses to be present as part of the measuring system.

Here, within the scope of the industrial process (e.g. in a production process for automobile parts), in which the measuring system is used for allowing defined very precise positioning of the object in space, there is, in a known cycle, a repetition of
  the object being positioned in a defined fashion during positioning phases, and hence the measuring system performs position measurements with respect to the positioning of the object, and of
  other process steps, more particularly processing, machining, monitoring and/or transportation steps (e.g. welding, adhesive bonding, folding, transporting, monitoring, etc.), during positioning pauses.

Here, the cycle defines and controls an advance of the industrial process.

Within the scope of the calibration method, there now are the following steps, which are known per se to a person skilled in the art:
  carrying out calibration measurements of a calibration measurement cycle comprising the capture of calibration measurement data, wherein the calibration measurement cycle has at least such a number and variety of calibration measurements that calibration parameters can be determined on the basis of the captured calibration measurement data, said calibration parameters at least relating to position and orientation of the first recording apparatus in a defined coordinate system, and establishing the calibration parameters on the basis of the calibration measurement data.

However, calibration measurements of the calibration measurement cycle according to the invention do not occur in a contiguous block as is conventional in the prior art, for example before starting the measuring function of the measuring system within the scope of the industrial process. Rather, the calibration measurement cycle is as per the invention subdivided into a plurality, more particularly a number of partial cycles—in contrast to being carried out en bloc as per the prior art—with one or more of the calibration measurements being associated with each of these.

Here, while maintaining the industrial process cycle, the partial cycles each take place in one of the positioning pauses during which, within the scope of the industrial process, there is no need to determine the position of the parts to be processed or of the gripping/processing tools (e.g. industrial, robots) as a result of e.g. processing or transportation steps (welding, soldering, onward transport, cooling-down times etc.)—such that the calibration measurement cycle distributed over a plurality, more particularly a number of positioning pauses.

Thus, according to the invention, a calibration measurement cycle is into a multiplicity of partial cycles, which each require relatively short time windows. These partial cycles are respectively distributed in time to positioning pauses during which no measurements are provided by means of the measuring system in respect of the positioning of the objects. Hence the positioning pauses are respectively used as calibration partial phases. As a result, within the scope of the method according to the invention for calibrating the measuring system, there is no need for either a calibration-dependent interruption or a calibration-dependent delay of the cycle specifically adapted to the respective industrial/production process. Thus, the calibration measurement cycle, which is split into many short partial cycles in time, is integrated into the industrial process without delaying the cycle, which has a negative influence on the advance of the industrial process.

Accordingly, the calibration can take place without interrupting/disturbing the cycle times by using the time windows between positioning measurements of the parts to be processed. In the process, the various calibration measurements are distributed over a number of time windows such that a complete calibration cycle is obtained after a certain amount of time. After this, the calibration measurements can more particularly be repeated continuously.

This temporal split of the calibration measurements, respectively into positioning pauses or positioning measurement dead times, allows the individual calibration measurements required for an overall calibration to be combined such that these can also be repeated or carried out virtually continuously while maintaining the cycle. By way of example, it is thus possible to use calibration measurement data from calibration measurements, which are respectively carried out in positioning pauses, during a sliding time window for continuously estimating the parameters. In particular, there is measurement data updated with calibration measurements for updated determination of the calibration parameters after each run-through partial cycle. Hence, according to the invention, there can continuously be an at least partly continuously updating calibration of the measuring system.

In conclusion, according to the present invention, the calibration of the measuring system is thus integrated into the running production process and dead times of the measuring system are used, namely times during which there is no need to determine the position of the parts to be processed or of the gripping/processing tools (e.g. industrial robots) as a result of e.g. processing or transportation steps (welding, soldering, onward transport, cooling-down times etc.). This can reduce and in particular even avoid adversely affecting the industrial/production process.

Here, according to the invention, it is nevertheless possible—particularly during the whole operational period of the industrial process—to establish calibration parameters that are adjusted, relatively timely and regularly, to the respectively current conditions of the surroundings in order to detect possible changes in the measurement surroundings and hence also in the production surroundings in a timely fashion and in order to adjust the measuring and control system to these changes.

The conflicting goals of, firstly, providing a measuring system that was respectively calibrated as recently as possible and hence allows high precision and of, secondly, disturbing/delaying the production advance of the industrial/production process, for which the measuring system is used, as little as possible or, in a best case scenario, not disturbing/delaying it at all by calibration processes can therefore be solved in a significantly improved fashion using the calibration method according to the invention.

The invention likewise relates to a computer program product that is stored on a machine-readable medium, or a computer data signal, embodied by an electromagnetic wave, with program code for carrying out the above-described calibration method, more particularly if the program is executed on an electronic data processing unit.

Moreover, the invention relates to such a measuring system for determining a positioning of an object that is to be positioned in a defined fashion within the scope of the industrial process.

Here, the measuring system comprises at least a first recording apparatus—more particularly at least two recording apparatuses—with a camera for capturing an image within a field of view and an angle measuring unit for very precisely determining an angular alignment of the camera. Moreover, provision is made for a unit for controlling at least the following steps of the above-described calibration method:

Carrying out calibration measurements of a calibration measurement cycle comprising the capture of calibration measurement data, wherein the calibration measurement cycle has at least such a number and variety of calibration measurements that calibration parameters can be determined on the basis of the captured calibration measurement data, said calibration parameters at least relating so position and orientation of the first recording apparatus in a defined coordinate system; and establishing the calibration parameters on the basis of the calibration measurement data.

According to the invention, the control unit is embodied or programmed such that the calibration measurement cycle is subdivided into a plurality, more particularly a number of partial cycles, with one or more calibration measurements being associated with each of these, and, while maintaining the industrial process cycle, the partial cycles each take place in one of the positioning pauses such that the calibration measurement cycle is distributed over a plurality, more particularly a number of positioning pauses and fits into the original cycle of the industrial process.

BRIEF DESCRIPTION OF THE DRAWINGS

The method according to the invention and the measuring system according to the invention are described, in a purely exemplary fashion, in more detail, below on the basis of concrete exemplary embodiments illustrated schematically in the drawings, with further advantages of the invention also being discussed. In detail.

DETAILED DESCRIPTION

Figure 1:
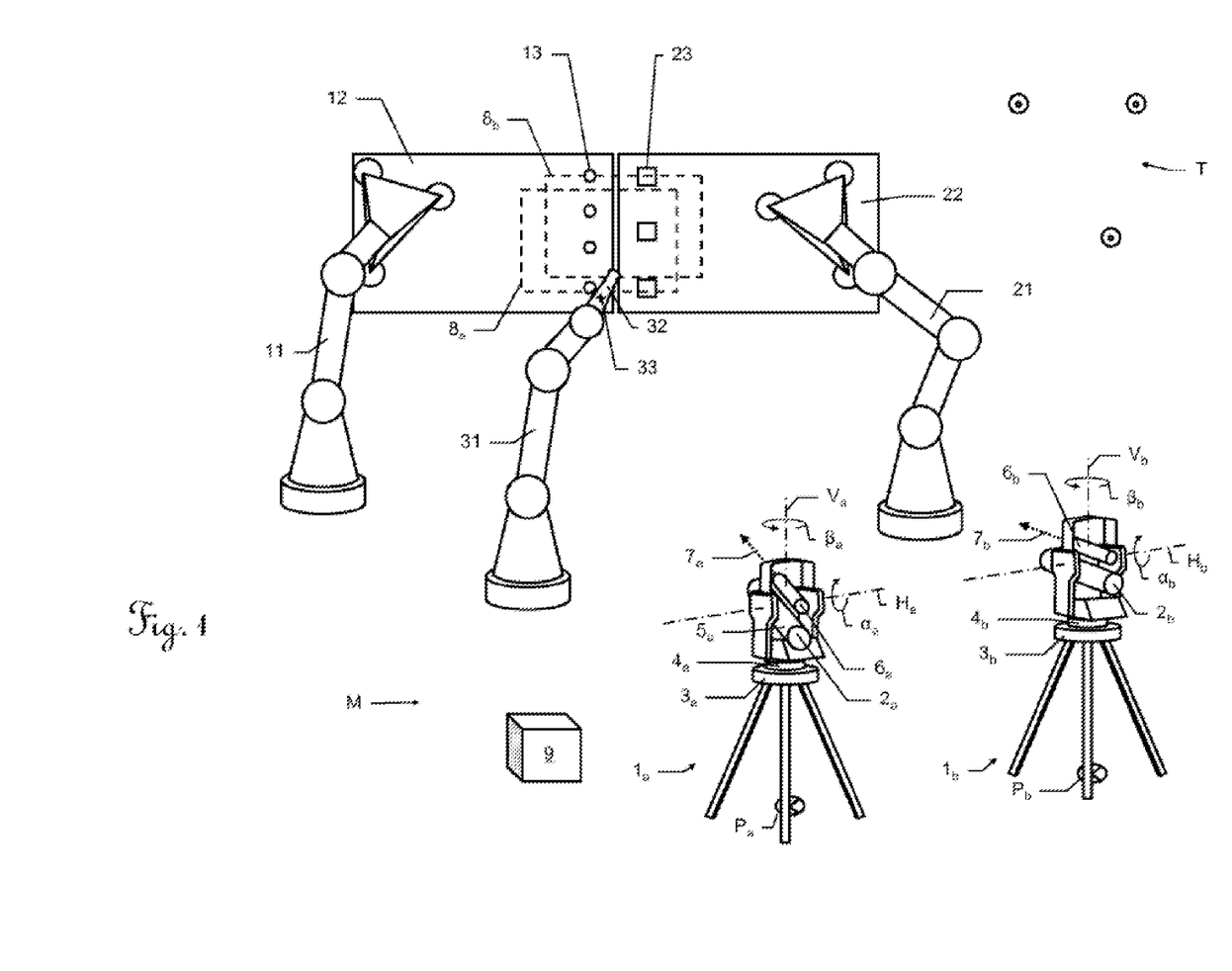
FIG. 1 shows an exemplary situation from an industrial process with a measuring system according to the invention in a first embodiment.

FIG. 1 shows a first embodiment of the measuring system M, with the aid of which an object 12, 22 to be processed within the scope of an industrial process can be placed very precisely into a predetermined final position.

Here, the measuring system M is designed such that the positions of a plurality of labeled points 13, 14 on the object 12, 22 are established by means of contactless coordinate measurements using image processing systems. This allows the position and orientation of the object 12, 22 to be determined very precisely and to be used for open-loop and/or closed-loop control of the positioning procedure required for the industrial process (e.g. for controlling an industrial robot 11, 21 gripping the object to be positioned).

In a purely exemplary fashion, the measuring system P has a first and a second recording apparatus 1a, 1b for this purpose. The two optical recording apparatuses 1a, 1b each have a camera 2a, 2b, namely a first camera 2a and a second camera 2b, for respectively recording an image within a specific field of view 8a, 8b such that, within the respective field of view 8a, 8b, there can be measurements and evaluations in the image recording.

A camera should in general terms be understood to mean an electronic device for recording points that can be captured optically, wherein the cameras 2a and 2b respectively comprise the equipment required for this, in particular an objective and corresponding image-recording elements, more particularly a CCD or CMOS image sensor and corresponding electronics. Here, the objective can optionally be equipped with a zoom and/or an (auto) focus, a fact of which a person skilled in the art is well aware. Hence the cameras 2a, 2b are suitable for photogrammetric measurements. Furthermore, the optical recording apparatuses 1a, 1b for example each comprise at least one drive unit 3a and 3b, respectively, for aligning the respective camera 2a and 2b—this brings about a movement of the respective field of view 8a and 8b, respectively, of the camera 2a and 2b. By way of example, the respective drive unit 3a or 3b is a pivot unit for pivoting the camera 2a or 2b about two pivot axes Ha, Hb, Va, Vb.

Additionally, the optical recording apparatuses 1a and 1b each have an angle measuring unit 4a and 4b, respectively, for very precisely capturing the angular alignment $\alpha a$, $\alpha b$, $\beta a$, $\beta b$ of the respective camera 2a and 2b, and so the respective field of view 8a and 8b, respectively, can be determined in the coordinate system of the space. As a result of the external referencing of the respective optical recording apparatus 1a and 1b, respectively, in the coordinate system of the space, each pixel very precisely defines a straight line in the coordinate system of the space, emerging from: firstly, the position of the pixel on the image sensor, i.e. the image recording; secondly, the alignment of the respective camera 2a and 2b, respectively, captured by the respective angle measuring unit 4a and 4b, respectively; thirdly, from the known position Pa, Pb of the respective optical recording apparatus 1a and 1b, respectively; and, fourthly, from the respective calibration parameters. Here, the term pixel need not necessarily be understood to mean a pixel of the camera sensor.

For the purpose of controlling the positioning procedure, provision can for example be made for a control unit 9, which has a data-processing apparatus designed for data processing. In particular, there is a data connection between the control unit 9 and the device carrying out the positioning (e.g. the industrial robot 11, 21 with a gripper device) and between said control unit and the at least two optical recording apparatuses 1a and 1b. The image recordings recorded by the cameras 2a and 2b are fed to the control unit 9 for carrying out the image processing and for obtaining the depth information. Furthermore, the angular alignments of the cameras 2a and 2b captured by the angle measuring units 4a and 4b are obtained by the control unit 9 as input signal. The drive units 3a and 3b are actuated by means of the control unit 9 for aligning the cameras 2a and 2b. The first industrial robot 11 can be moved into positions that are prescribed by the control unit 9. The data connection required for this can be brought about by means of voltage signals, radio signals, optical signals or any other communication channel. The reference and calibration parameters, in particular the individual positions, alignments and dimensions of the involved components are stored in the control unit 9—provided these are needed for carrying out the method. The control unit 9 can be a unit, for example a personal computer with suitable interfaces, or else a number of individual components, which communicate with or are networked to one another, are separated spatially and for example are components of individual devices. In particular, it is possible for the control unit 9, which should be understood as an abstract concept, to be a component of the optical recording units 1a and 1b and/or of the first industrial robot 11.

The first object 12, which should be positioned into the final position in space, can for example have known features 13 that can be captured optically. These first features 13 can be any features that can be captured by means of the cameras 2a and 2b of the recording units 1a and 1b. Thus, the phrase can be captured optically should be understood to mean properties that allow it to be captured by the cameras 2a and 2b and not necessarily properties that make it visible to the human eye. The features 13, 23 are such that determining the positions thereof defines the position, i.e. the location and the alignment of the object in space, as uniquely as possible.

In a purely exemplary fashion, the recording apparatuses 1a, 1b can additionally also an emitter 6a, 6b, which is designed to emit structured light 7a, 7b within the respective field of view 8a, 8b of the cameras. The first emitter 6a can, for example, be aligned together with the first camera 2a by means of the first drive unit 3a. In order to determine the position of the object 12, 22, or to position said object very precisely, it is now possible to project structured light 7a, 7b onto the object 12, 22 such that the structured light 7a, 7b lies within the field of view of the two cameras 2a, 2b. The position of the object 12 in the coordinate system of the space can additionally be determined by triangulation in addition image recordings of the cameras 2a, 2b imaging the structured light 7a, 7b. This can further increase the accuracy in determining the position and the precision during the positioning. Furthermore, it is even possible to carry out measurements on a section of an object that does not have markings that can be captured optically.

The object 12, 22 is any object, more particularly a sheet part, that should be positioned very precisely in the space and can, for example, be gripped and held by an industrial robot 11, 21. However, the object to be positioned can, for example, also be a tool 32 (mere examples include a folding tool, a welding tool or a boring device) or a processing robot 31 (mere examples include an automated welding device), which should, using the measuring system P, be positioned very precisely and in a defined fashion within the scope of the industrial process. To this end, the tool 32 can in turn have a known feature 33 that can be captured optically.

A multiplicity of calibration measurements of a predetermined and routine calibration measurement cycle are carried out in order to calibrate such a measuring system M and the components of the measuring system M, with the aid of which an object 12, 22, 32 can be positioned very precisely in an intended position within the scope of an industrial process. Here, the calibration measurement cycle is designed such that it has at least such a number and variety of calibration measurements that the calibration measurement data—captured when the calibration measurements were carried out—can be used to determine at least those calibration parameters that relate to the position and orientation of the recording apparatus of the measuring system H in a defined coordinate system. However, the calibration measurement cycle is more particularly designed and embodied such that further calibration parameters are also established, e.g. calibration parameters relating to internal calibration parameters of individual components of the measuring system M, such as camera constant, main point, camera distortion, internal calibration parameters of the angle measuring unit, etc.

Specifically, the calibration measurement cycle can also have such a number and variety of calibration measurements that the calibration parameters are overdetermined by the calibration measurement data calibration parameters can then be established by fitting, more particularly according to the least squares method.

Various options are known for establishing the calibration parameters. By way of example, it is possible to determine the positions Pa and Pb as calibration parameters and it is also possible to determine further external calibration parameters of the recording apparatuses 1a and 1b by means of referenced external measuring systems, e.g. optical measuring systems such as a laser tracker, which determine the respective position of the recording apparatuses 1a and 1b in space. This can be brought about by target markers that are applied to the recording apparatuses 1a and 1b. The external calibration of the alignments can also be carried out by means of external measuring systems. It is also possible to position the recording apparatuses 1a and 1b on reference points, the positions of which are known very precisely in the coordinate system of the space, in particular by means of forced centering. Alternatively, there is the possibility that the recording apparatuses 1a and 1b are referenced and calibrated in space by means of their own measuring systems. To this end, the recording apparatuses 1a and 1b can each have e.g. a laser rangefinder 5a, 5b, which can be aligned together with the respective camera 2a or 2b by means of the respective drive unit 3a or 3b and she angular alignment of which can be captured very precisely by means of the respective angle measuring unit 4a or 4b, which is calibrated in the coordinate system of the space. It goes without saying that it is possible to use other suitable pivot, and measuring devices for orienting the cameras and precisely capturing the alignments.

The positions Pa and Pb of the respective recording apparatus 1a or 1b in the coordinate system can for example be determined by targeting stationary target markers T by means of the respective laser rangefinder 5a or 5b. However, as alternative or in addition thereto, the self-referencing and calibration can preferably be brought about by triangulation by recording an image of stationary target markers which are specifically installed for the calibration, and by image processing.

Images from the cameras and the respective angular alignment from the angle measuring units can respectively—in different alignments—be captured as the calibration measurements in this case, and so the image coordinates of the defined target markers T can be determined in the captured images using electronic image processing. In particular, the positions of the target markers T, arranged in a defined fashion in space, and/or the distances between the target markers T in the coordinate system of the space are known very precisely here. By way of example, the target markers T can also either be fixedly installed (stationary) in the production cell, for example, or else be attached to moving parts—such as e.g. a robot arm. Specifically, use can also be made of a so-called scale bar in this case, which consists of two target markers T and a fixed connection between the latter (e.g. two spheres as target markers, which are connected by a fixed rod, with the distance between the two centers of the spheres being determined very precisely).

The calibration measurements of a calibration measurement cycle—in particular a multiplicity of image recordings of respectively one or more of the preinstalled target markers T for the calibration—are for example respectively carried out under a predefined variation of the angular alignment of the camera or cameras and/or under variation of the positions of the target markers in the coordinate system of the space, with the positions of the target markers T and/or a shift of the target markers T between the calibration measurements in the coordinate system of the space respectively being known or codetermined. If the measuring system M has two cameras, the field of view 3a of the first camera 2a and the field of view 8b of the second camera 2b can overlap within the scope of a calibration measurement such that at least one same target marker T, more particularly a plurality of same target markers T, are captured in both the first and the second image.

It is subsequently possible to establish the current external and optionally also internal calibration parameters of the measuring system M from the combined calibration measurement data captured when such a calibration measurement cycle is carried out.

Hence, such a method can be used to calibrate the optical recording apparatuses 1a, 1b in a three-dimensional coordinate system of the space. As a result, both the position Pa, Pb and the angular alignment are respectively known indirectly or directly in that coordinate system in which the object 12, 22, 32 should also be positioned.

In particular, the cameras can also be internally calibrated on the basis of the captured calibration measurement data, and so possible errors in the optics, the image sensors or the electronics in particular, e.g. distortions, etc. can be taken into account and compensated for. The angle measuring units 4a and 4b for very precisely capturing the angular alignment of the respective cameras 2a and 2b can accordingly also be internally calibrated using suitable captured calibration measurement data and referenced as external calibration in the utilized coordinate system (e.g. in respect of the zero positions thereof).

Here, the calibration measurements in a calibration measurement cycle can be carried out, in particular in a preprogrammed fashion, by the control unit 9 as a unit for controlling the calibration method. By way of example, a calibration program can to this end be stored on the control unit 9 and be used to carry out a calibration of the measuring system. Thus, for example, the above-described steps of the calibration method can be initiated, the respective components of the measuring system can be controlled accordingly in order to carry out the calibration measurements and the calibration parameters can be derived and established from the calibration measurement data captured thereby by using the control unit 9.

According to the invention, the control unit 9 of the measuring system M is now embodied such that the calibration measurement cycle is—in contrast to the en-bloc calibration known from the prior art—subdivided into a plurality, more particularly a number of partial cycles, with one or more calibration measurements of the entire cycle being associated with each of these.

Moreover, the control unit 9 controls the partial cycles being carried out such that, while maintaining a cycle of the industrial process into which said partial cycles are inserted, each partial cycle takes place in a positioning pause—during which, within the scope of the industrial process, there is no need to determine the position of the parts to be processed or the gripping/processing tools (e.g. industrial robots) as a result of e.g. processing or transportation steps (welding, soldering, onward transport, cooling-down times etc.). As a result, the calibration measurement cycle is distributed over a more particularly a number of positioning pauses and without negative effects on the cycle and the advance of the industrial process defined thereby—integrated into the industrial/production process.

Here, any production and manufacturing process (mere examples include a production line for producing, processing, finishing, maintaining, etc. parts) can be considered for the industrial process, in which, in a specific process cycle, repeatedly and in particular alternately, an object is respectively—during positioning phases—very precisely positioned in a predetermined position with the aid of a measuring system like the one described above and in which there are no measurements by the measuring system in respect of a positioning procedure during positioning pauses, in which there are other process steps of the industrial process (such as processing, machining, monitoring and/or transportation steps).

Here the cycle controls an advance of the industrial process. The production cycle—e.g. for welding together two sheet parts—can typically lie between 30 and 120 seconds. Within the scope of a production cycle, there can be, as mere examples, gripping of the sheet parts, very precise positioning of the sheet parts into a predetermined position (during which the measuring system carries out positioning measurements), welding together of the sheet parts, and depositing or onward transporting of the joined sheet parts. Now, in this example, positioning pauses are those phases in which there is no need for the measuring system to undertake measurements in respect of the positioning of the sheet parts. According to the invention, it is precisely during these positioning pauses, which otherwise constitute dead times for the measuring system, that one measurement or a few measurements are now carried out for calibrating the measuring system, which measurements are associated with relatively short partial calibration cycles.

Here, the cycle can also vary during the industrial process, and so the cycle times can have different lengths depending on the envisaged production step of the process.

Figure 2:
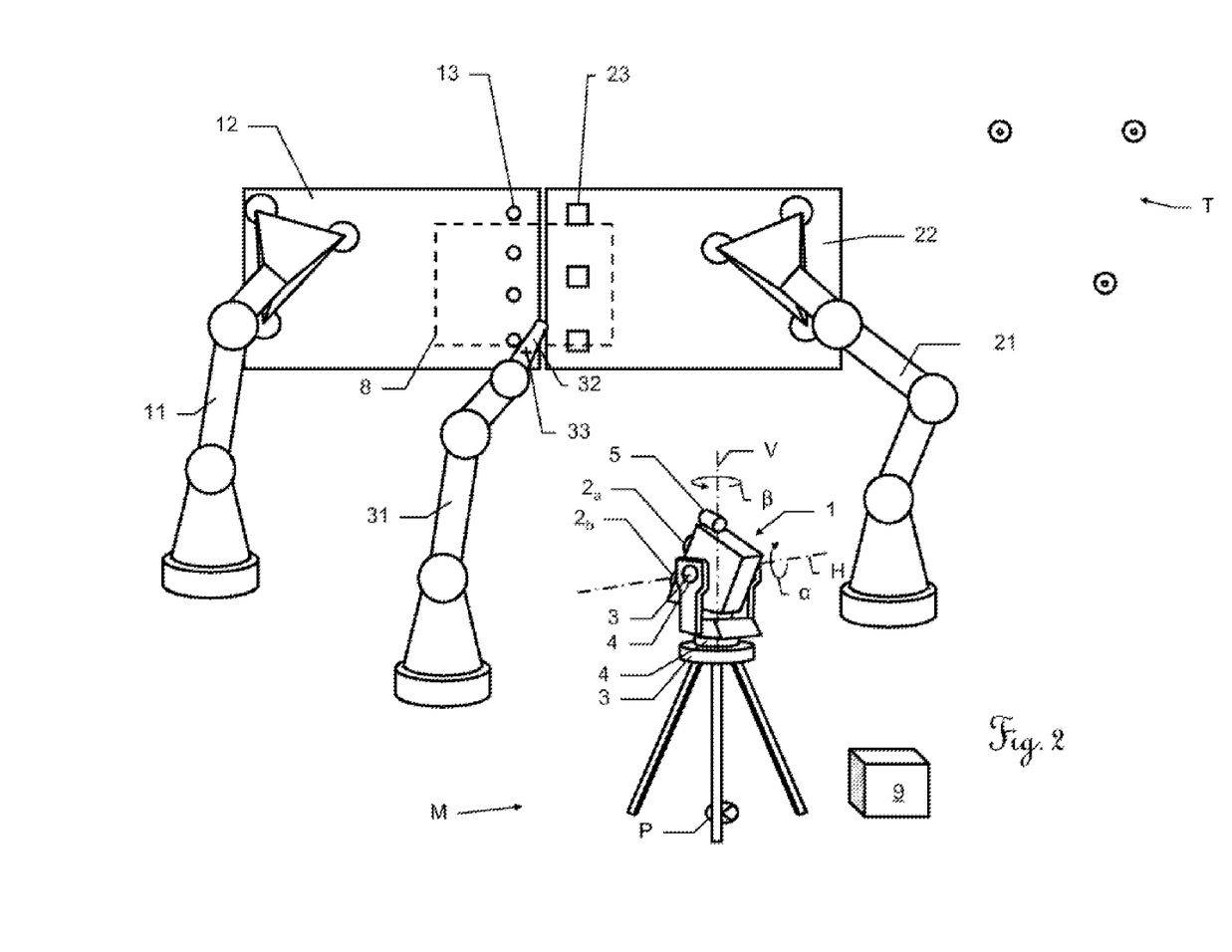
FIG. 2 shows an exemplary situation from an industrial process with a measuring system according to the invention in a second embodiment.

FIG. 2 shows an exemplary situation from an industrial process with a measuring system M according to the invention in a second embodiment. Here, the measuring system M now has a recording apparatus 1 embodied as a 3D image recording apparatus for capturing a three-dimensional image within the first capturing region 8. The three-dimensional image is composed of a multiplicity of pixels in the first image, each of which is associated with depth information.

Suitable 3D image recording apparatuses for such measuring systems are known to a person skilled in the art and are explained, at the outset, within the scope of the description of the prior art.

Depending on the specific requirements of the measuring system, a person skilled in the art can in each case accordingly select and assemble measurement components that are suitable therefor. The calibration method according to the invention can be applied analogously for all such measuring systems.

Figure 3:
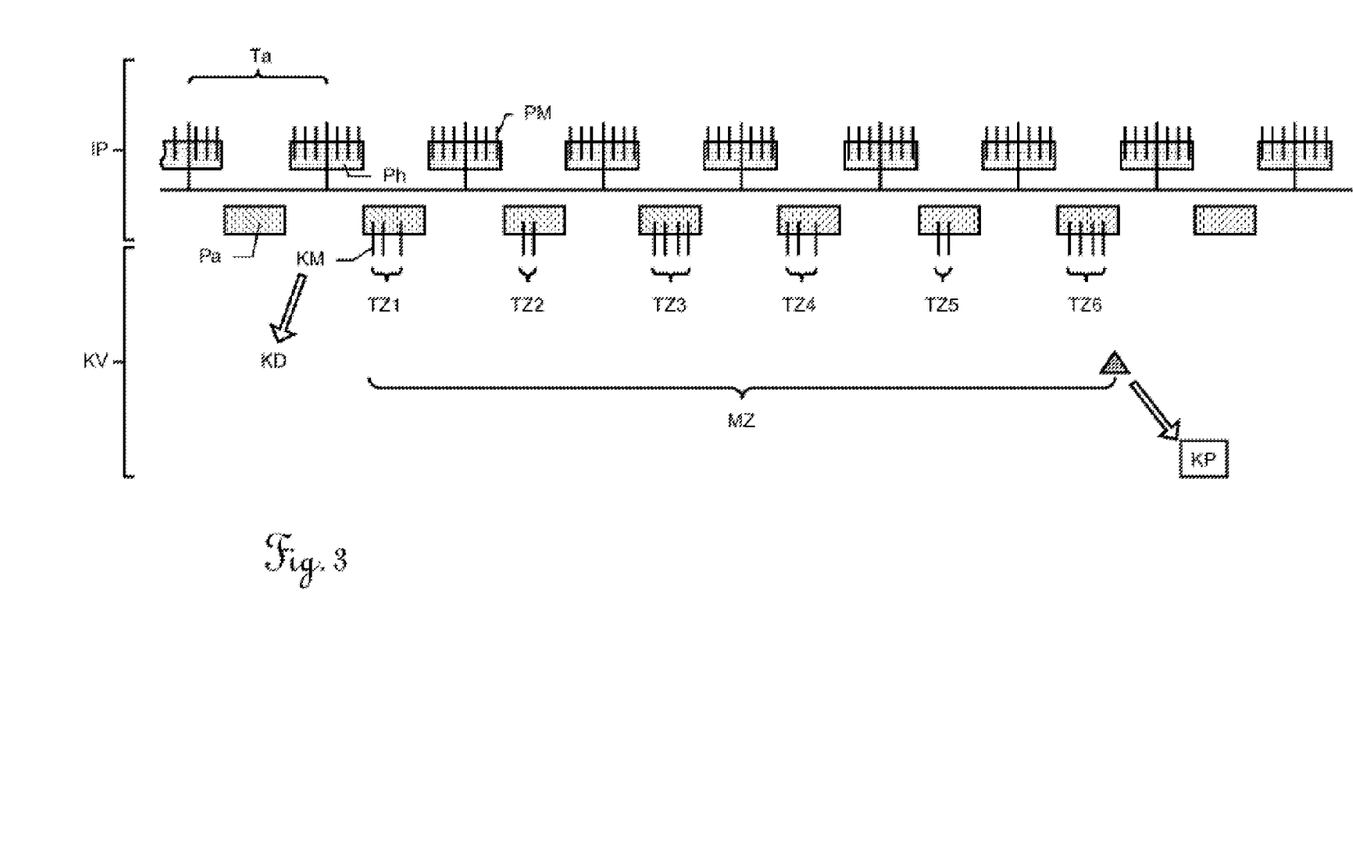
FIG. 3 shows a schematic diagram that explains the integration of a first exemplary embodiment of the calibration method according to the invention in an industrial process.

FIG. 3 shows a diagram with a schematically illustrated industrial process IP and a defined cycle Ta, which controls the advance of the industrial process IP.

Within the scope of the industrial process IP, there in the prescribed cycle Ta and more particularly alternately, a repetition of
- an object being positioned in a defined fashion during positioning phases Ph, with the measuring system making measurements PM in respect of the positioning of the object, and of
- other process steps, more particularly processing, machining, monitoring and/or transportation steps, during positioning pauses Pa, which other process steps do not require measurements PM in respect of a positioning of an object by the measuring system within the scope of an industrial process IP.

According to the invention, the calibration measurement cycle MZ, which serves for calibrating KV the measuring system, is subdivided into a plurality, more particularly a number of partial cycles TZ1, TZ2, TZ3, TZ4, TZ5, TZ6, with one or more calibration measurements KM being associated with each of these.

While maintaining the cycle Ta of the industrial process IP, the partial cycles TZ1, TZ2, TZ3, TZ4, TZ5, TZ6 are each carried out in one of the positioning pauses Pa such that the calibration measurement cycle MZ is distributed over a plurality, more particularly a number of positioning pauses Pa, which measurement cycle in its entirety has at least such a number and variety of calibration measurements KM that the desired calibration parameters KP in respect of the measuring system can be determined on the basis of the calibration measurement data KD captured in the process.

After respectively carrying out the individual partial cycles TZ1, TZ2, TZ3, TZ4, TZ5, TZ6 in the positioning pauses Pa such that the calibration measurements KM are performed embedded into the industrial process IP without influencing the advance thereof, the sought-after calibration parameters KP can be derived or estimated from the overview of the captured calibration measurement data KD.

Specifically, the calibration measurement cycle MZ can have such a number and variety of calibration measurements KM that the calibration parameters KP are overdetermined by the calibration measurement data KD captured in the process. In this case, the calibration parameters KP can for example be established by a statistical estimate of the parameters or by fitting, more particularly according to the least squares method.

Figure 4:
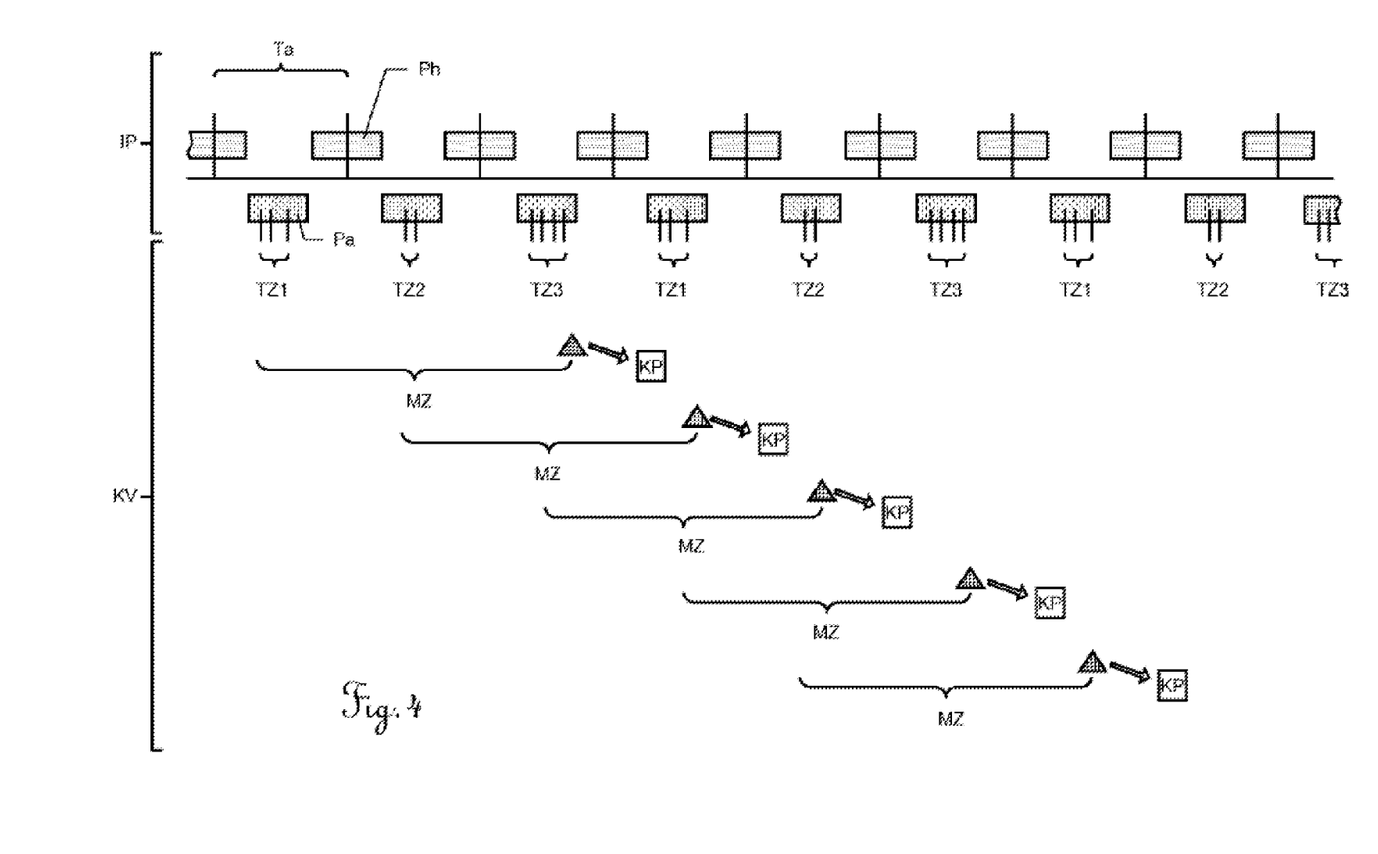
FIG. 4 shows a schematic diagram that explains the integration of a second exemplary embodiment of the calibration method according to the invention in an industrial process.

FIG. 4 shows a development of the calibration method KV according to the invention from FIG. 3, wherein the calibration measurement cycle MZ in this case now for example has the partial cycles TZ1, TZ2, TZ3.

It is possible to identify from FIG. 4 that at least some—or, in the illustrated case, all—of the partial cycles TZ1, TZ2, TZ3 of the overall measurement cycle MZ are respectively once again carried out repeatedly in one of the positioning pauses Pa while maintaining the cycle Ta; this is carried out continuously. Here, all or at least some of the calibration parameters KP can now be continuously established, respectively for the purpose of updating and in particular after each repetition of one of the partial cycles TZ1, TZ2, TZ3, taking into account the calibration measurement data captured during the repetition of the partial cycles TZ1, TZ2, TZ3.

The partial cycles TZ1, TZ2, TZ3 of the calibration measurement cycle can preferably be repeatedly carried out sequentially in succession with a predetermined order. In the process, all or some of the calibration parameters KP can likewise be established, respectively for the purpose of updating, after each repetition of one of the partial cycles TZ1, TZ2, TZ3. However, alternatively, the calibration parameters KP can be updated after completing a complete calibration measurement cycle MZ, i.e. after repeating all partial cycles TZ1, TZ2, TZ3; in this case, the calibration can take place taking into account the calibration measurement data captured during the repetition of the partial cycles TZ1, TZ2, TZ3.

Moreover, the calibration measurement data in the form of old data, captured within the scope of partial cycles that were already repeated in the meantime, can be completely replaced in the process by the respectively current calibration measurement data, captured during the repetition of these partial cycles, when the calibration parameters KP are established for the purpose of updating. Accordingly, the calibration measurement cycle MZ as it were continuously shifts in time over the industrial process IP and the calibration parameters KP of the measuring system are established in a continuously updating fashion.

Thus, the amount of calibration measurement data taken into account for deriving the calibration parameters KP accordingly is a dynamic quantity.

According to the invention, this makes it possible to establish calibration parameters KP that are fitted to the respectively current surrounding conditions in a relatively timely and regular fashion—in particular throughout the entire industrial process IP—in order to detect possible changes in the measurement surroundings and hence also in the production surroundings in a timely fashion or to adjust the measuring and control system to these changes.

The conflicting goals of, firstly, providing a measuring system that was respectively calibrated as recently as possible and hence allows high precision and of, secondly, disturbing or delaying the production advance of the industrial/production process, for which the measuring system is used, as little as possible or, in a best case scenario, not disturbing or delaying it at all by calibration processes can therefore be solved in an improved fashion.

Figure 5:
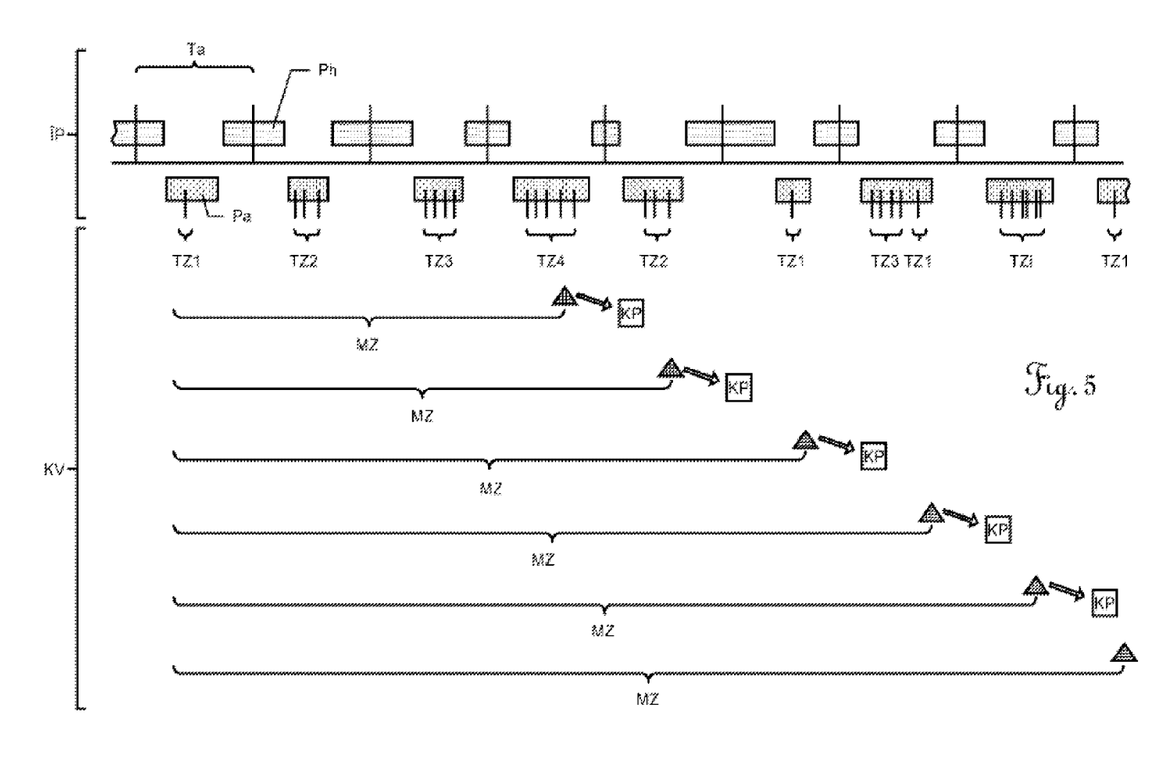
FIG. 5 shows a schematic diagram that explains the integration of a third exemplary embodiment of the calibration method according to the invention in an industrial, process.

In accordance with the development of the calibration method KV according to the invention from FIG. 5, at least some of the partial cycles TZ2, TZ1, TZ3, TZi are once again respectively carried out repeatedly in one of the positioning pauses Pa while maintaining the cycle Ta; this is carried out continuously. Here, in particular, a number of the partial cycles, e.g. two partial cycles TZ3, TZ1, can also be carried out in a single positioning pause Pa if the duration of the respective positioning pause Pa is fixed and known in advance, it is possible, in particular, for that partial cycle or those partial cycles whose time requirements fit well into the time window of the positioning pause Pa to be carried out during this positioning pause Pa.

Moreover, the calibration parameters KP can respectively be established for the purpose of updating, taking into account the calibration measurement data captured during the repetition of the partial cycles, after each repetition of one of the partial cycles—or else after each positioning pause Pa.

In the process, according to this example, even the calibration measurement data in the form of old data, captured within the scope of those partial cycles that were already repeated in the meantime, is now at least partly, more particularly completely, taken into account when the calibration parameters KP are established for the purpose of updating. As a result, the calibration measurement cycle MZ increases, virtually continuously, in length and the amount of calibration measurement data taken into account for establishing the calibration parameters KP is continuously increased by repeating the partial cycles.

However, optionally, the old data can in this case also be weighted less strongly than the respectively most current calibration measurement data when the calibration parameters KP are established for the purpose of updating.

Figure 6:
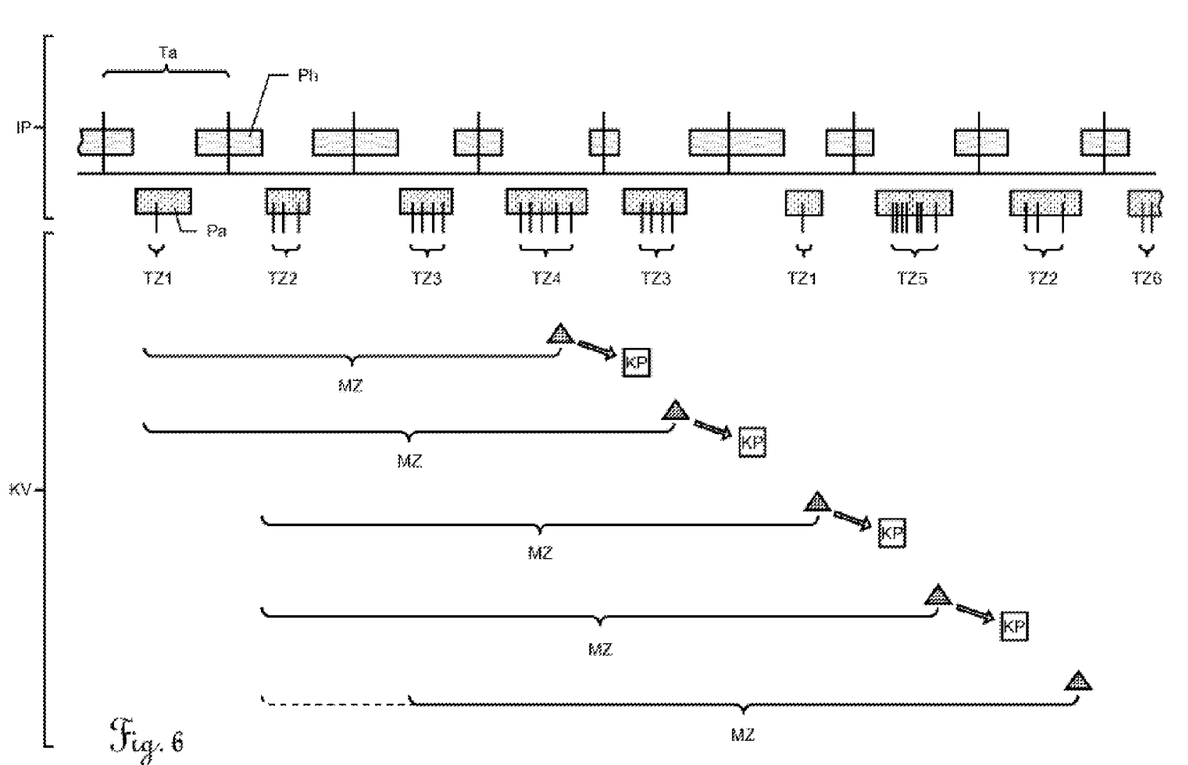
FIG. 6 shows a schematic diagram that explains the integration of a fourth exemplary embodiment of the calibration method according to the invention in an industrial process.

According to the development of the calibration method KV according to the invention from FIG. 6, at least some of the partial cycles are respectively once again carried out repeatedly in one of the positioning pauses Pa while maintaining the cycle Ta; this is carried out continuously. After each repetition of one of the partial cycles, all or at least some of the calibration parameters HP are respectively established for the purpose of updating, taking into account the calibration measurement data captured during the repetition of the partial cycles.

Here, according to this example, the old data is partly taking into account when establishing the calibration parameters KP for the purpose of updating and, however, it is also partly replaced by the measurement data captured during the repetition of a partial cycle or it is weighted less strongly.

Accordingly, the amount of calibration measurement data taken into account for deriving the calibration parameters KP thus is a dynamic variable. Firstly, this amount is continuously extended by respectively newly captured calibration measurement data; secondly, there can however be filtering or weighting of the data collected in the totality in this case such that this results in the best possible estimate or derivation of the calibration parameters KP. By way of example, implausible "outliers" in the calibration measurement data can immediately be filtered out in their entirety. Moreover, the selection of the partial cycle to be repeated in the next positioning pause can be made dependent on how plausible the old data captured for this partial cycle is considered to be. By way of example, it is therefore possible to select the partial cycle for the next possible repetition that has "outliers" in the already captured old data, i.e. high deviations therein.

It goes without saying that these illustrated figures only schematically illustrate possible exemplary embodiments.

The various approaches can likewise be combined with one another and with calibration methods and measuring systems from the prior art.

What is claimed is:

1. A calibration method for a measuring system, wherein the measuring system is designed to determine a positioning of an object that is to be positioned in a defined fashion within the scope of an industrial process, and comprises at least a first recording apparatus with a first camera for capturing a first image within a first field of view and a first angle measuring unit for very precisely determining a first angular alignment of the first camera, wherein, within the scope of the industrial process, there is, in a known cycle, a repetition of:
the object being positioned in a defined fashion during positioning phases and of the measuring system performing measurements with respect to the positioning of the object; and of
other process steps, more particularly processing, machining, monitoring and/or transportation steps, during positioning pauses,
wherein the cycle controls an advance of the industrial process;
wherein the following steps are performed within the scope of the calibration method:
carrying out calibration measurements of a calibration measurement cycle comprising the capture of calibration measurement data, wherein the calibration measurement cycle has at least such a number and variety of calibration measurements that calibration parameters can be determined on the basis of the captured calibration measurement data, said calibration parameters at least relating to position and orientation of the first recording apparatus in a defined coordinate system, and
establishing the calibration parameters on the basis of the calibration measurement data, wherein:
the calibration measurement cycle is subdivided into a plurality of partial cycles with one or more of the calibration measurements being associated with each of these; and
while maintaining the cycle, the partial cycles each take place in one of the positioning pauses such that the calibration measurement cycle is distributed over a plurality of positioning pauses.

2. The calibration method as claimed in claim 1, wherein:
at least some of the partial cycles are respectively carried out repeatedly in one of the positioning pauses while maintaining the cycle; and
at least some calibration parameters are continuously established, respectively for the purpose of updating and specifically after each repetition of one of the partial cycles, taking into account the calibration measurement data captured during the repetition of the partial cycles.

3. The calibration method as claimed in claim 1, wherein:
at least some of the partial cycles are respectively carried out continuously in one of the positioning pauses while maintaining the cycle; and
all calibration parameters are continuously established, respectively for the purpose of updating and specifically after each repetition of one of the partial cycles, taking into account the calibration measurement data captured during the repetition of the partial cycles.

4. The calibration method as claimed in claim 2, wherein all partial cycles of the calibration measurement cycle are carried out repeatedly, in particular sequentially in succession with a predetermined order.

5. The calibration method as claimed in claim 2, wherein within the scope of those partial cycles that were already repeated in the meantime, captured calibration measurement data, as old data, is at least partly not taken into account and/or weighted less strongly when the calibration parameters are established for the purpose of updating and is at least partly replaced by, in particular, the calibration measurement data captured during the repetition of these partial cycles.

6. The calibration method as claimed in claim 2, wherein that calibration measurement data in the form of old data, captured within the scope of partial cycles that were already repeated in the meantime, is completely replaced by that calibration measurement data, captured during the repetition of these partial cycles, when the calibration parameters are established for the purpose of updating such that the calibration measurement cycle continuously shifts in time.

7. The calibration method as claimed in claim 2, wherein even calibration measurement data in the form of old data, captured within the scope of those partial cycles that were already repeated in the meantime, is at least partly taken into account when the calibration parameters are established for the purpose of updating such that the calibration measurement cycle continuously increases in length and the amount of calibration measurement data taken into account for establishing the calibration parameters is continuously increased by repeating the partial cycles.

8. The calibration method as claimed in claim 2, wherein even calibration measurement data in the form of old data, captured within the scope of those partial cycles that were already repeated in the meantime is completely taken into account when the calibration parameters are established for the purpose of updating such that the calibration measurement cycle continuously increases in length and the amount of calibration measurement data taken into account for establishing the calibration parameters is continuously increased by repeating the partial cycles.

9. The calibration method as claimed in claim 1, wherein the calibration measurement cycle has such a number and variety of calibration measurements that the calibration parameters are overdetermined by the calibration measurement data captured in the process and the calibration parameters are established by fitting.

10. The calibration method as claimed in claim 1, wherein the calibration measurement cycle has such a number and variety of calibration measurements that the calibration parameters are overdetermined by the calibration measurement data captured in the process and the calibration parameters are established by fitting using the least squares method.

11. The calibration method as claimed in claim 1, wherein, as the calibration measurements, in each case at least:
a first image is captured using the first camera; and
the first angular alignment is captured using the first angle measuring unit;
and also
image coordinates of one or more defined target markers are determined in the captured first image using electronic image processing.

12. The calibration method as claimed in claim 1, wherein, as the calibration measurements, in each case at least:
a first image is captured using the first camera; and
the first angular alignment is captured using the first angle measuring unit;
and also
image coordinates of one or more defined target markers are determined in the captured first image using electronic image processing, wherein positions of the target markers in the coordinate system and/or distances between the target markers in the coordinate system are known.

13. The calibration method as claimed in claim 1, wherein the calibration measurements in a calibration measurement cycle are respectively carried out:
   under a variation, in particular a predefined variation, of the first angular alignment of the first camera; and/or
   under a variation of the positions of the target markers in the coordinate system, with the positions of the target markers and/or a shift of the target markers between the calibration measurements in the coordinate system respectively being known or codetermined.

14. The calibration method as claimed in claim 1, wherein:
   the first recording apparatus has a first drive unit for modifying a first angular alignment of the first recording apparatus,
   the measuring system has at least a second recording apparatus comprising:
      a second camera for capturing a second image within a defined second capture area;
      a second drive unit for modifying a second angular alignment of the second recording apparatus; and
      a second angle measuring unit for very precisely determining the second angular alignment;
   the calibration parameters additionally relate to position and orientation of the second recording apparatus in the coordinate system; and
   as the calibration measurements, in each case at least:
      a second image is captured using the second camera; and
      the second angular alignment is captured using the second angle measuring unit; and also
      image coordinates of one or more defined target markers are determined in the captured second image using electronic image processing,
   wherein positions of the target marker in the coordinate system and/or distances between the target markers in the coordinate system are known.

15. The calibration method as claimed in claim 14, wherein the field of view of the first camera and the field of view of the second camera overlap within the scope of a calibration measurement such that at least one same target marker are captured both in the first and the second image.

16. The calibration method as claimed in claim 14, wherein the field of view of the first camera and the field of view of the second camera overlap within the scope of a calibration measurement such that a plurality of same target markers are captured both in the first and the second image.

17. The calibration method as claimed in claim 1, wherein the first recording apparatus is embodied as a 3D image recording apparatus for capturing a three-dimensional image within the first capture area, with the three-dimensional image being composed of a multiplicity of pixels of the first image, which pixels are respectively associated with depth information.

18. A tangible computer program product that is stored on a non-transitory machine-readable medium with program code for carrying out the calibration method as claimed in claim 1, when the program is executed on an electronic data processing unit.

19. A measuring system for determining a positioning of an object that is to be positioned in a defined fashion within the scope of an industrial process, wherein, within the scope of the industrial process, there is, in a known cycle, a repetition of:
   the object being positioned in a defined fashion during positioning phases and of the measuring system performing measurements with respect to the positioning of the object and of
   other process steps, more particularly processing, machining, monitoring and/or transportation steps, during positioning pauses,
   wherein the cycle controls an advance of the industrial process,
   and wherein the measuring system comprises at least:
   a first recording apparatus with a first camera for capturing a first image within a first field of view and a first angle measuring unit for very precisely determining a first angular alignment of the first camera; and
   a unit for controlling at least the following steps of the calibration method comprising:
      carrying out calibration measurements of a calibration measurement cycle comprising the capture of calibration measurement data, wherein the calibration measurement cycle has at least such a number and variety of calibration measurements that calibration parameters can be determined on the basis of the captured calibration measurement data, said calibration parameters at least relating to position and orientation of the first recording apparatus in a defined coordinate system; and
      establishing the calibration parameters on the basis of the calibration measurement data, wherein:
      the calibration measurement cycle is subdivided into a plurality, more particularly a number of partial cycles, with one or more calibration measurements being associated with each of these, and
      while maintaining the cycle, the partial cycles each take place in one of the positioning pauses such that the calibration measurement cycle is distributed over a plurality of positioning pauses.

* * * * *